O. H. WECKESSER.
TIRE FOR AUTOMOBILES.
APPLICATION FILED SEPT. 6, 1911.
1,024,382.
Patented Apr. 23, 1912.
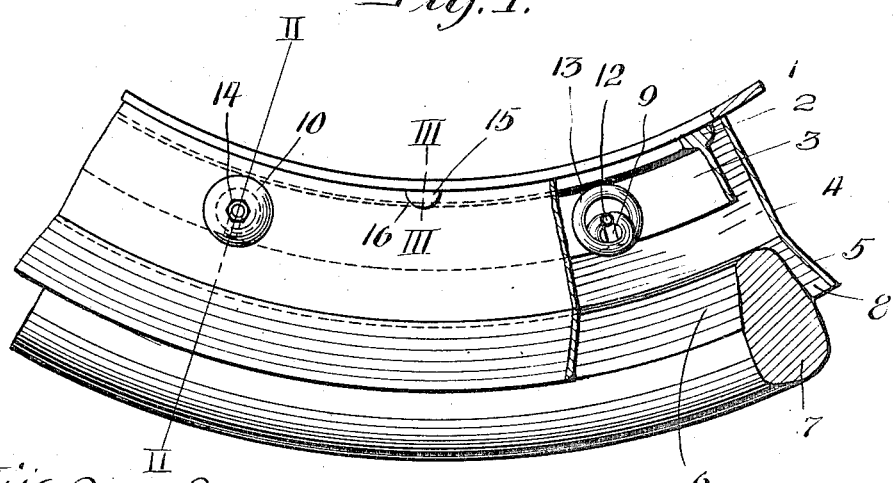
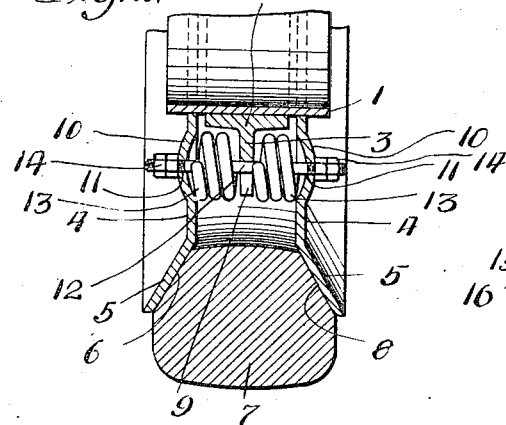
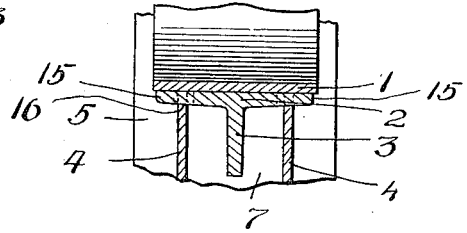
WITNESSES
INVENTOR
O. H. WECKESSER
by
Attorneys

UNITED STATES PATENT OFFICE.

OSCAR H. WECKESSER, OF ROSS TOWNSHIP, ALLEGHENY COUNTY, PENNSYLVANIA.

TIRE FOR AUTOMOBILES.

1,024,382.	Specification of Letters Patent.	Patented Apr. 23, 1912.

Application filed September 6, 1911. Serial No. 647,808.

*To all whom it may concern:*

Be it known that I, OSCAR H. WECKESSER, a citizen of the United States of America, residing in Ross township, in the county of Allegheny and State of Pennsylvania, have invented certain new and useful Improvements in Tires for Automobiles, of which the following is a specification, reference being had therein to the accompanying drawing.

This invention relates to tires for automobiles and similar vehicles, and my invention aims to provide:—first, a resilient tire that obviates the necessity of an inner pneumatic tube and an expensively constructed outer tube or shoe; second, a tire wherein the inherent elasticity of rubber and the action of retractile springs are utilized for cushioning a vehicle; third, a tire that eliminates skidding or sliding over smooth surfaces without the use of chains or anti-skidding devices; fourth, a yieldable tire construction that is not susceptible to injury by ordinary use and inexpensive to maintain in an operative condition, and fifth, a tire consisting of comparatively few parts easily and quickly assembled and readily renewed without resorting to the use of an expensive kit.

I attain the above objects by a tire or rim that will serve for a motor or other road vehicle wheels, the tire being constructed to combine the elasticity of solid rubber and the resiliency of springs in forming a cushion that will take up to a large degree the vibrations set up between the periphery of the wheel and an automobile body, particularly upon rough roads. The tire has been constructed with a yieldable rim adapted to hold a solid tire in such a manner that its inner face is removed from the felly or rim of the wheel, whereby under pressure, the tire besides being compressed, has an inner movement. This inner movement of the tire is cushioned by circumferentially arranged retractile springs, a series of which coöperate with the elasticity of the tire in cushioning the felly or rim of the wheel.

The invention will be hereinafter specifically described and then claimed, and reference will now be had to the drawing, wherein there is illustrated a preferred embodiment of the invention, but it is to be understood that the structural elements thereof are susceptible to such variations and modifications as fall within the scope of the appended claims.

In the drawing:—Figure 1 is a side elevation of a portion of the tire partly broken away and partly in section, Fig. 2 is a cross sectional view of the tire taken on the line II—II of Fig. 1, and Fig. 3 is a similar view taken on the line III—III of Fig. 1.

To put my invention into practice, I use a felly or rim 1 that can be supported in various manners from the hub or central portion of a wheel, and mounted upon this felly is an annular T bar having the base flanges 2 thereof of less width than the felly and the web 3 of said bar located intermediate the edges of the felly. This bar serves functionally as anchoring means for yieldable rim members 4 arranged circumferentially of the felly upon both sides of the T bar. The rim members 4 have the inner edges thereof engaging the felly 1, between the outer edges thereof and the edges of the base flanges 2, while the outer edges of the rim members are provided with angularly disposed flanges 5 forming an annular seat 6 that tapers inwardly from the outer edges of the flanges 5 of the members 4.

Movably mounted upon the annular seat 6 is a solid rubber tire 7 having the inner side edges thereof beveled, as at 8 to fit between the flanges 5. The tread of the tire 7 is of a greater width than the inner side of the tire, whereby the tire will have a wedging action between the members 4 when compressed by a load.

The web 3 of the T bar is provided with slots 9 at equally spaced points throughout the periphery of said web, and the rim members 4 have cup-shaped depressions 10 on either side of and in alinement with the slots 9. These depressions are formed by pressing or stamping the inner sides of the members 4, whereby the depressions will project from the outer sides thereof. The depressions 10 have central apertures 11 alining with the bottom of the slot 9, and arranged in said slot and the apertures 11 is a yieldable tie rod or bolt 12. This tie rod or bolt is made with two coiled portions 13 that are positioned between the web 3 and the members 4, the central portion of the tie rod extending through the slot 9 and the threaded ends thereof extending through the openings 11. Nuts 14 are screwed upon the ends of the tie rod to retain the yieldable tie rod in position, but any other fastening means can be resorted to in connection with the outer end of the tie rod for maintaining the members 4 upon the ends thereof.

The base flanges 2 of the T bar, at a point intermediate the slots 9, are provided with outwardly extending guides 15 that extend to the edges of the felly 1. These guides extend through slots 16 provided therefor in the inner edges of the rim members, and while said guides allow an expansive and retractive movement of the members 4, yet one member cannot shift circumferentially relatively to the other member. It is therefore obvious that the yieldable tie rod is relieved of any stress or strain that would be incurred by one rim section shifting circumferentially with respect to the other.

From the foregoing it will be observed that I have devised a tire having yieldable tire supporting rim members that are yieldably connected together in such a manner that the parts of the tire can be readily assembled.

What I claim is:—

1. In a tire an annular rim having a flat outer face, an outwardly projecting bar positioned against the outer face of said rim centrally thereof, outwardly projecting flat annular rim members having their inner edges positioned against the outer face of the rim at opposite sides of the bar and of greater cross-sectional length than the cross-sectional length of the bar, a tire seated between the outer portions of said rim members and spaced from the outer edge of said bar, and tie rods arranged at intervals transversely with respect to and extending through said bar and rim members and each including an integral yieldable portion interposed between one side of the bar and an inner face of a rim member.

2. A tire for wheels comprising an annular rim having a flat outer face, a T-bar positioned against the outer face of said rim centrally thereof and having one leg projecting outwardly and disposed at right angles with respect to the outer face of the rim, outwardly projecting rim members in the form of flat annular bands having their inner edges positioned against the outer face of the rim, each of said rim members positioned at one side of the bar and inwardly of an edge of the rim, said members having angularly disposed outer portions, the outer portion of one member extending in an opposite direction with respect to the outer portion of the other member and said portions forming a tapering tread member seat, a resilient tread member having a portion of each side thereof beveled, said beveled portions of the tread member mounted against said seat and transversely extending tie rods projecting through said rim members and bar and each having a pair of yieldable portions, each yieldable portion being disposed between one side of the bar and the inner face of one of said rim members, said yieldable portions permitting said rim members to shift laterally upon the rim with respect to each other when the resilient tread member is shifted relatively to said rim.

3. A tire comprising an annular rim having a flat outer face, an outwardly projecting bar positioned against the outer face of the rim centrally thereof, outwardly projecting rim members in the form of annular bands having their inner edges positioned against the felly at each side of said bar, a resilient tread member seated between the outer portions of said rim members and spaced from the outer edge of said bar, tie rods extending through said rim members and bar and each having two portions of its length coiled to provide yieldable elements, each of said yieldable elements interposed between one side of the bar and one of said rim members permitting of the lateral shifting of the rim members upon the rim with respect to each other when the tread member shifts relatively to the rim, and means carried by said bar and extending through said rim members for preventing one rim member from shifting circumferentially on the rim with respect to the other rim member.

In testimony whereof I affix my signature in the presence of two witnesses.

OSCAR H. WECKESSER.

Witnesses:
MAX H. SROLOVITZ,
CHRISTINA T. HOOD.